US007912593B2

(12) United States Patent
Ridenour

(10) Patent No.: US 7,912,593 B2

(45) Date of Patent: Mar. 22, 2011

(54) MERGING AND SPACING SPEED TARGET CALCULATION

(75) Inventor: Richard D. Ridenour, Glendale, AZ (US)

(73) Assignee: Aviation Communication & Surveillance Systems, LLC, Phoenix, AZ (US)

( * ) Notice: Subject to any disclaimer, the term of this patent is extended or adjusted under 35 U.S.C. 154(b) by 926 days.

(21) Appl. No.: 11/732,223

(22) Filed: Apr. 2, 2007

(65) Prior Publication Data

US 2008/0243314 A1 Oct. 2, 2008

(51) Int. Cl.
*G05D 1/02* (2006.01)
*G06F 7/70* (2006.01)

(52) U.S. Cl. ................ 701/3; 701/7; 701/300; 244/183; 340/947

(58) Field of Classification Search .................. 701/3, 4, 701/5, 7, 10, 16, 18, 300, 120, 122; 244/183, 244/191; 340/947, 951, 952, 979; 348/117, 348/143; 342/29, 30, 37
See application file for complete search history.

(56) References Cited

U.S. PATENT DOCUMENTS 6,173,159 B1 * 1/2001 Wright et al. ................ 455/66.1
6,393,358 B1 * 5/2002 Erzberger et al. ............. 701/120
6,584,400 B2 * 6/2003 Beardsworth ................. 701/120
6,587,757 B2 * 7/2003 Sainthuile ......................... 701/1
6,718,236 B1 * 4/2004 Hammer et al. .................. 701/3
7,248,963 B2 * 7/2007 Baiada et al. ................. 701/120
7,412,324 B1 * 8/2008 Bagge et al. .................. 701/120
2007/0061055 A1 * 3/2007 Stone et al. ....................... 701/2

FOREIGN PATENT DOCUMENTS

WO WO 2006135916 12/2006

OTHER PUBLICATIONS

Hull, Mark et al., “Technology-Enabled Airborne Spacing and Merging,” Digital Avionics Systems Conference, Oct. 2004, pp. 2.B.1-9.
Crane, Leslie et al., “Monte Carlo Simulation of ADS-B Application: Flight Deck Based Merging and Spacing,” Integrated Communications, Navigation and Surveillance Conference, May 2007, 27 pages.
Abbott, Terence S., “Speed Control Law for Precision Terminal Area In-Trail Self Spacing,” Langley Research Center, Hampton, Virginia, Jul. 2002, 14 pages.
“CoSPACE 2005—ASAS Sequencing and Merging Flight Deck User Requirements,” European Organisation for the Safety of Air Navigation, Jul. 2005, vol. 1, 60 pages.

* cited by examiner

*Primary Examiner* — Tan Q Nguyen
(74) *Attorney, Agent, or Firm* — Allen J. Moss; Squire, Sanders & Demspey L.L.P.

(57) ABSTRACT

Embodiments of the present invention provide methods, computer programs, and apparatus for adjusting a speed target of an aircraft. In particular, the adjustment of the speed target of the aircraft may allow that aircraft to maintain merging and spacing constraints with respect to a leading aircraft. According to one embodiment of the present invention, the speed target of an aircraft may be adjusted by obtaining a speed target, obtaining own ship track data for the aircraft, obtaining lead ship track data for a leading aircraft, and calculating a speed target adjustment based on the speed target, the own ship track data, the lead ship track data and merging and spacing constraints.

24 Claims, 5 Drawing Sheets

MERGING AND SPACING SPEED TARGET CALCULATION

DESCRIPTION OF THE INVENTION

1. Field of the Invention

The present invention relates to systems and methods for merging and spacing aircraft, and more particularly, to systems and methods for calculating merging and spacing speed targets for aircraft.

2. Background of the Invention

"Merging and spacing" is a term used to describe an air traffic procedure whereby multiple aircraft traveling from a variety of starting points are merged into a single file line with appropriate space between successive aircraft in preparation for approach and landing. Today, human air traffic controllers communicate heading and speed commands to aircraft to perform this merging and spacing process. This procedure occurs as aircraft from different departure airports converge on a common destination airport.

Conventionally, there is a system on many aircraft today that informs a pilot when to begin to decelerate (e.g., for speed constraints and speed limits that are imposed by air traffic control). This system is known as a flight management system, or FMS. The FMS often has detailed aircraft performance data and can accurately calculate when an aircraft should begin to decelerate based on such factors as gross weight, air temperature, winds, etc. However, an FMS does not take into account the position or speed of other aircraft, so it will not adjust its speed target to achieve and maintain proper spacing behind a lead aircraft.

Some attempts have been made to generate a speed command based on a time-history of a lead aircraft (lead ship) for merging and spacing. Such attempts utilize algorithms that look at the time history of a lead aircraft's speed and position profile and generate a speed target for "own ship" (i.e., the aircraft on which the algorithm is installed). Such algorithms can perform in either constant distance or constant time spacing. In constant time spacing, and assuming own ship is initially at the proper spacing behind the lead aircraft, the algorithm will cause own ship to change speed at the same location as the lead ship changed speed. However, such constant time spacing algorithms are generally unsatisfactory in situations where the lead ship has different flight characteristics than own ship.

Such a situation can be analogized to vehicles on a highway where, for example, the lead vehicle is a motorcycle and the second vehicle is a fully-loaded cement mixer. The motorcycle, approaching a pothole, for example, begins to decelerate when it is 100 ft away from the pothole. The motorcycle decelerates from 60 mph to 30 mph in one second and crosses the pothole at a slow speed. As for the cement mixer, if it does not begin to decelerate until it is 100 ft from the pothole (i.e. the same location where the motorcycle began to decelerate), it is unlikely that the cement mixer will have enough time or the distance required to slow down to a desired speed before it hits the pothole.

Just as all road vehicles do not accelerate or decelerate at the same rate, all aircraft do not accelerate or decelerate at the same rate. This is especially true when aircraft are descending. Some relatively "slick" aircraft can barely decelerate at all when they are descending. Pilots of some aircraft say that they can "go down or slow down, but not both at the same time." Just as it may not be sufficient for the cement mixer to begin decelerating at the same location as the motorcycle did, it may often be the case that it is insufficient for a "slick" aircraft to begin decelerating at the same location as a lead ship that is able to decelerate more easily.

Other attempts at merging and spacing algorithms make predictions as to when an aircraft should begin to decelerate based on a flight plan speed constraint or speed limit. In essence, such algorithms provide speed targets to an aircraft based on the distance remaining in a flight profile (e.g., the distance left to an airport), however, Such algorithms use average aircraft performance values, ignoring the fact that aircraft performance varies from aircraft to aircraft.

With respect to the highway analogy above, that would be equivalent to assuming that all vehicles can brake like a standard full-size sedan and changing speed targets accordingly. Such an approach would result in the motorcycle braking a little sooner for the pothole than necessary, and still giving the cement mixer too little time and/or distance to slow to a desired speed.

SUMMARY OF THE INVENTION

Embodiments of the present invention provide methods, computer programs, and apparatus for adjusting a speed target of an aircraft. In particular, the adjustment of the speed target of the aircraft allows that aircraft to maintain merging and spacing constraints with respect to a leading aircraft.

According to one embodiment of the present invention, the speed target of an aircraft may be adjusted by obtaining a speed target, obtaining own ship track data for the aircraft, obtaining lead ship track data for a leading aircraft, and calculating a speed target adjustment based on the speed target, the own ship track data, the lead ship track data and merging and spacing constraints.

According to another embodiment of the present invention, the speed target adjustment may be limited based on at least one of the speed target, own ship distance to destination, own ship speed, own ship altitude, lead ship distance to destination, lead ship speed, and lead ship altitude.

According to yet another embodiment of the present invention, the speed target adjustment may be added to the speed target to form a merging and spacing speed target.

According to still another embodiment of the present invention, the merging and spacing speed target may be reported to a pilot of the aircraft.

According to another embodiment of the present invention, the speed target adjustment may be added to the speed target to form a merging and spacing speed target if it is determined that the speed target adjustment is greater than a predetermined threshold.

According to yet another embodiment of the present invention, the flight characteristics of the aircraft may be adjusted to achieve the speed target adjustment.

According to still another embodiment of the present invention, the speed target may be obtained from a flight management system resident on the aircraft.

According to another embodiment of the present invention, the lead ship track data may be received from the leading aircraft via ADS-B squitters.

The above-summarized method may be carried out with a program stored on a computer-readable medium or with an apparatus, as will be discussed in more detail below.

It is to be understood that the descriptions of this invention herein are exemplary and explanatory only and are not restrictive of the invention, as claimed.

DESCRIPTION OF THE EMBODIMENTS

Reference will now be made in detail to the present exemplary embodiments of the invention, examples of which are illustrated in the accompanying drawings.

Embodiments of the present invention provide methods, computer programs, and apparatus for adjusting a speed target of an aircraft. In particular, the adjustment of a speed target of an aircraft allows that aircraft to maintain merging and spacing constraints with respect to a leading aircraft.

Figure 1:
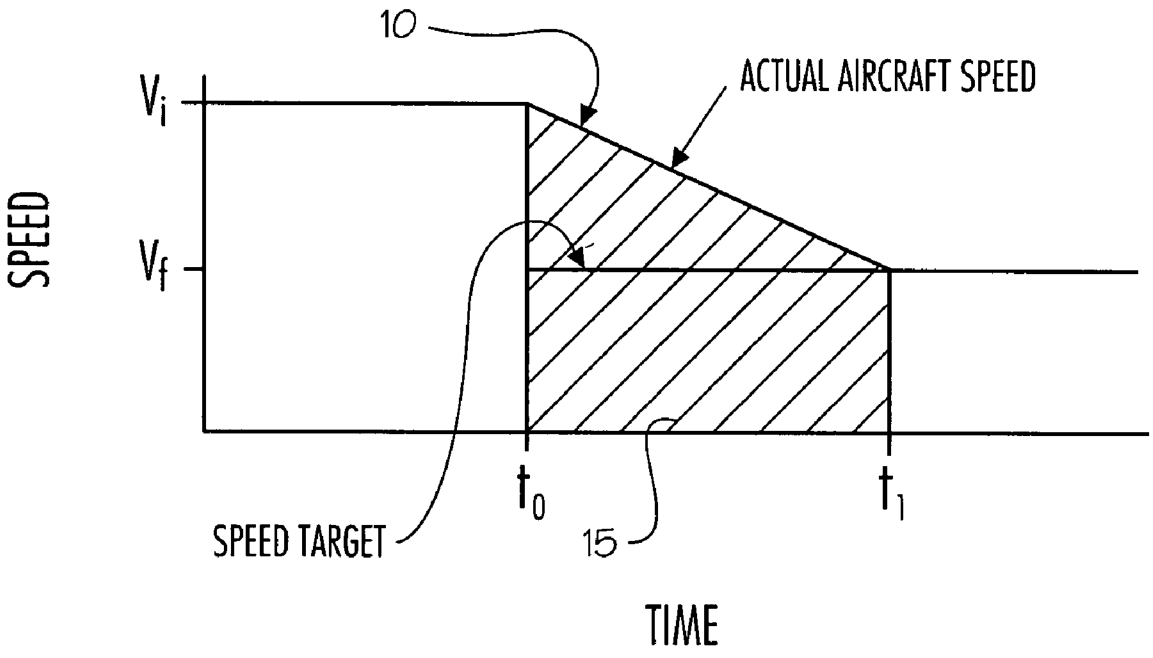
FIG. 1 shows a graph of change in aircraft velocity over time.

FIG. 1 shows a graph of change in aircraft velocity over time. Line 10 shows the velocity of a relatively "draggy" aircraft (i.e., an aircraft that slows down relatively easily) as it changes from an initial velocity $v_i$ to a lower final velocity $v_f$ from $t_0$ to time $t_1$. This "draggy" aircraft will decelerate at some rate that is a function of several parameters, which may include airframe-specific values, velocity, etc. The average acceleration (or, in this instance, deceleration) of the "draggy" aircraft can be calculated by the equation $(v_f-v_i)/(t_1-t_0)$. The distance flown in this time may be calculated by the equation $\int v(t)\,dt$ from time $t_0$ to $t_1$ and is represented by area 15 under line 10.

Figure 2:
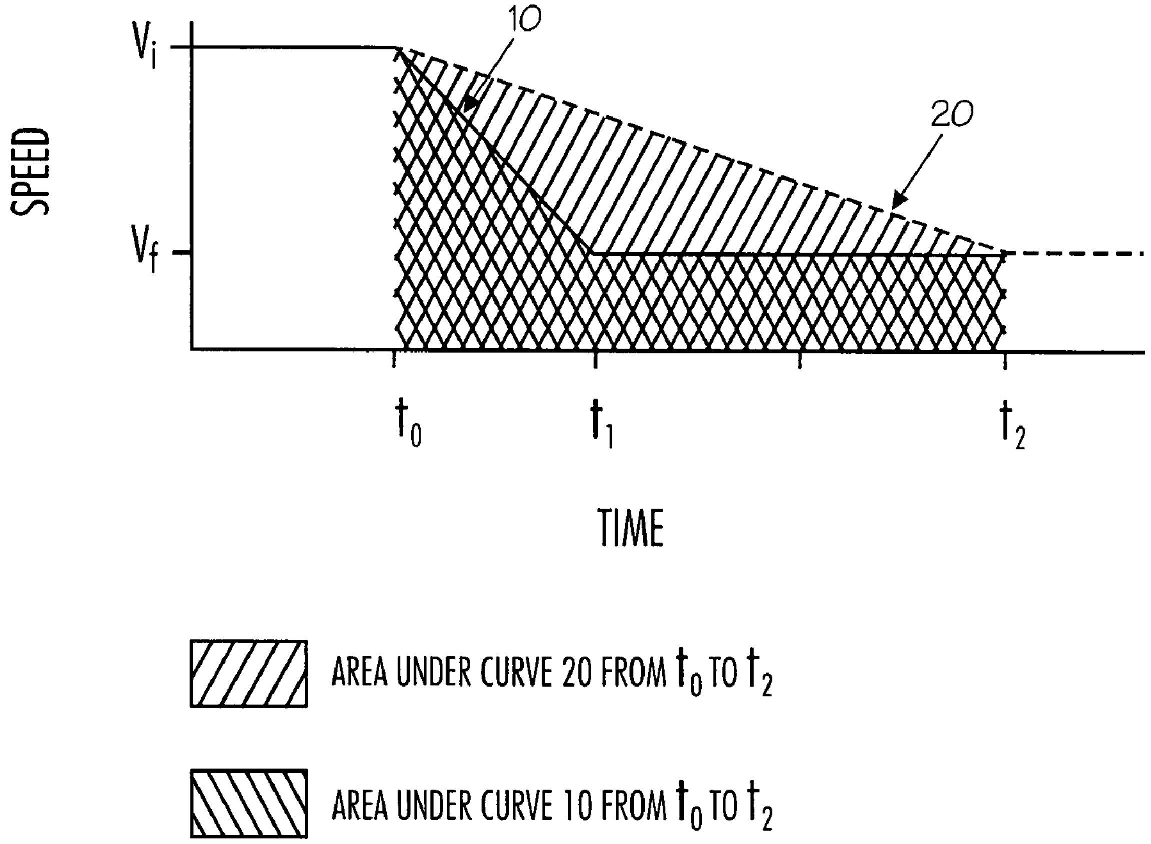
FIG. 2 shows a graph of change in aircraft velocity over time for two different aircraft.

FIG. 2 shows a graph of change in aircraft velocity over time for two different aircraft beginning their respective decelerations at the same time. Within the framework of constant time spacing, as illustrated by FIG. 2, the in trail aircraft will not begin to decelerate at the same time as the lead aircraft, but instead will begin to decelerate at a later time when the in trail aircraft is near or at the point in space where the lead ship began its deceleration. For clarity, the separate time scales have been skewed in FIG. 2 to show near simultaneous initiation of deceleration for the aircraft. Again, line 10 shows the velocity of a relatively "draggy" aircraft as it changes from an initial velocity $v_i$ to a lower final velocity $v_f$ from $t_0$ to time $t_1$. Dashed line 20, however, shows the velocity of a relatively "slick" aircraft (i.e., an aircraft that does not slow down as easily) as it changes from an initial velocity $v_i$ to a lower final velocity $v_f$ from $t_0$ to some time $t_2$, which is after time $t_1$. Since the average speed of the speed profile represented by dashed line 20 is greater than the average speed of the speed profile represented by line 10, the distance covered by the "slick" aircraft will be greater than that covered by the "draggy" aircraft over an equal period of time. As such, the spacing between these two aircraft will either increase or decrease depending on which aircraft is following and which aircraft is leading. As such, a constant time spacing algorithm for merging and spacing would not maintain proper spacing in this example. It would be necessary for one or both aircraft to perform additional speed adjustments to reestablish proper spacing.

Figure 3:
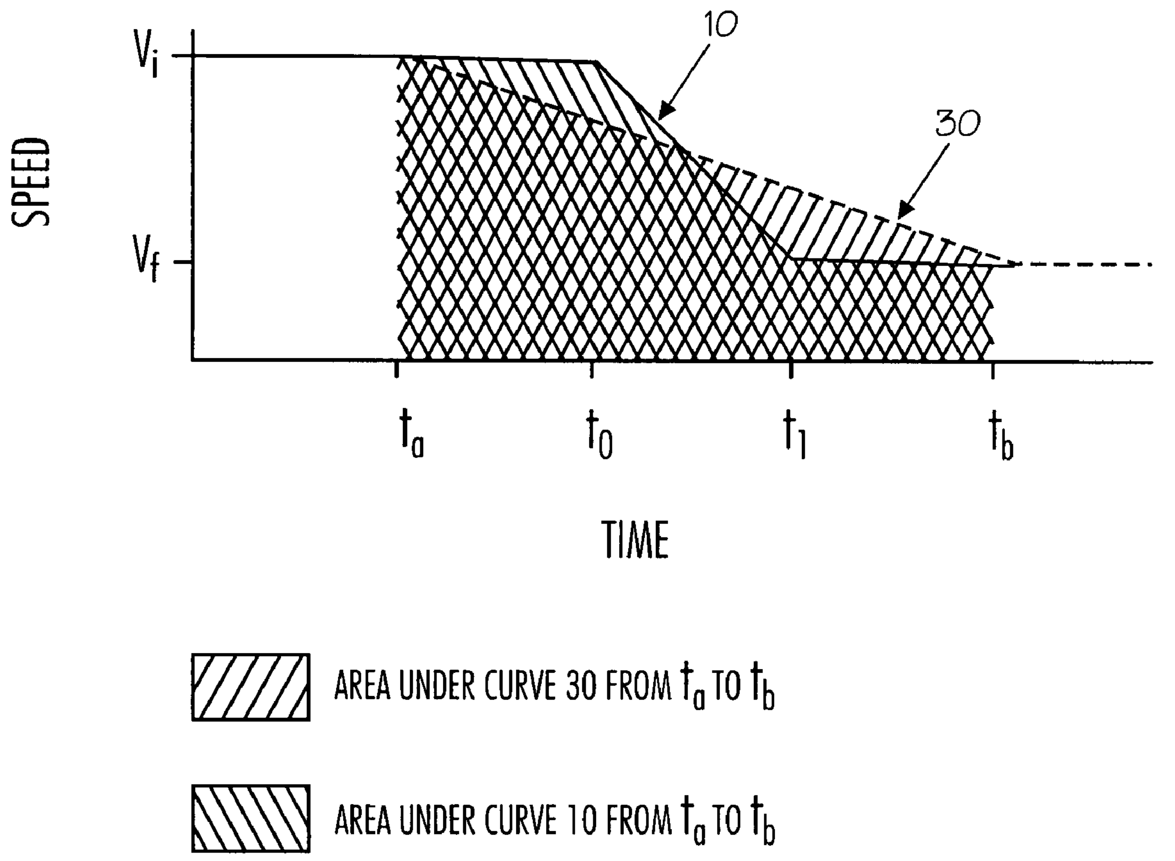
FIG. 3 shows a graph of change in aircraft velocity over time for two different aircraft using an embodiment of the present invention.

In order to better ensure proper spacing is maintained during the deceleration, the "slicker" aircraft would need to begin a deceleration "sooner" (distance-wise) than the "draggy" aircraft. FIG. 3 shows a graph of change in aircraft velocity over time for two different aircraft where they cover the same distance during deceleration. Again, line 10 shows the velocity of a relatively "draggy" aircraft as it changes from an initial velocity $v_i$ to a lower final velocity $v_f$ from $t_0$ to time $t_1$. Dashed line 30, however, shows the velocity of a relatively "slick" aircraft (i.e., an aircraft that does not slow down as easily) as it changes from an initial velocity $v_i$ to a lower final velocity $v_f$ from $t_a$ (which is before $t_0$) to some time $t_b$, (which is after time $t_1$). By selecting a time $t_a$ that is early enough for the deceleration rate of the "slick" aircraft, the area under dashed line 30, and thus the distance traveled by the "slick" aircraft can be made to be equal to the distance traveled by the "draggy" aircraft. In effect, $\int v(\text{slick})$ from $t_a$ to $t_b = \int v(\text{draggy})$ from $t_a$ to $t_b$. As such, the "draggy" and "slick" aircraft would maintain the same merging and spacing distance.

According to one embodiment of the present invention, a desired merging and spacing distance may be achieved by using speed target information from a flight management ("FMS") as a basis for a merging and spacing speed target, and then adjusting the speed target based on own ship's (i.e., the aircraft on which the present invention is installed) spacing behind a lead aircraft. It is understood, however, that such speed target information may be obtained from any system onboard or external to the aircraft or may be provided by an aircraft pilot. This improves the chance that own ship has enough time to decelerate based on own ship's specific performance capability, while not requiring the merging and spacing function to have direct knowledge of what that performance capability is.

Figure 4:
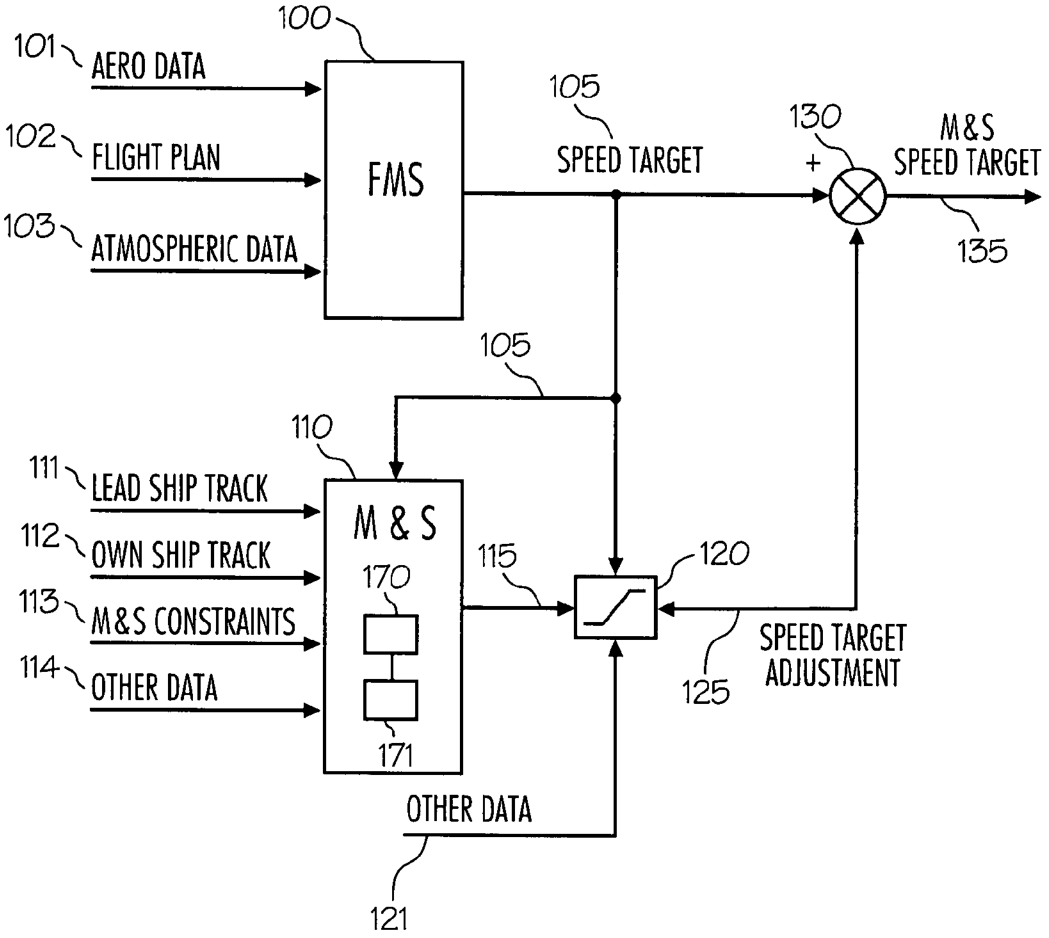
FIG. 4 is a block diagram of components and signals that may be employed in an embodiment of the present invention.

FIG. 4 is a block diagram of components and signals that may be employed in an embodiment of the present invention. This embodiment may utilize existing on board equipment to calculate nominal deceleration points based on detailed aerodynamic data, and then utilize the merging and spacing techniques of the present invention to make adjustments to the speed target generated by the existing on board equipment to manage spacing between own ship and a lead ship.

The embodiment shown in FIG. 4 may utilize an FMS 100 that may produce a speed target 105. Conventional FMS systems generally consider own ship's aerodynamic data 101 and atmospheric data 103 to produce a speed target 105 that may achieve the parameters contained in flight plan 102. Flight plan 102 may comprise essentially a "roadmap" of waypoints (latitude, longitude, altitude, and time) that an aircraft may travel through to move from a starting point to an ending point.

Speed target 105 may be provided to merging and spacing unit 110 as an input. The functions of merging and spacing unit 110 may be established with computer-readable code. As seen in FIG. 4, merging and spacing unit 110 may include a processor 170 to execute computer-executable code stored in memory 171 to perform desired functions of merging and spacing unit 110.

Processor 170 may comprise any circuit that performs a method that may be recalled from memory and/or performed by logic circuitry. The circuit may include conventional logic circuit(s), controller(s), microprocessor(s), and state machine(s) in any combination. Methods of the present invention may be implemented in circuitry, firmware, and/or software. Any conventional circuitry may be used (e.g., multiple redundant microprocessors, application specific integrated circuits). For example, processor 170 may include an Intel PENTIUM® microprocessor or a Motorola POWERPC® microprocessor. Processor 170 may cooperate with memory 171 to perform methods of the present invention, as discussed herein.

Memory 171 may be used for storing data and program instructions in any suitable manner. Memory 171 may provide volatile and/or nonvolatile storage using any combination of conventional technology (e.g., semiconductors, magnetics, optics). For example, memory 171 may include random access storage for working values and persistent storage for program instructions and configuration data. Programs and data may be received by and stored in system 171 in any conventional manner.

It should be noted that merging and spacing unit 110 need not be implemented as a separate unit with a separate processor 170 and memory 171. Instead, the merging and spacing functionality of the present invention may be stored and executed using any processor and memory able to receive the inputs that will be described herein. As one example, the merging and spacing unit 110 could be completely subsumed within an existing FMS by installing new computer-executable code and designating the desired inputs.

Returning to the inputs of the merging and spacing unit 110, in addition to speed target 105, additional inputs may include lead ship track data 111, own ship track data 112, merging and spacing constraints 113, and other data 114.

Lead ship track data 111 may comprise data that describes the track of the aircraft that own ship is following. Lead ship track data 111 may include the altitude, latitude, and longitude of the lead ship over a series of time periods. The lead ship track data may be received in the form of an Automatic Dependent Surveillance Broadcast ("ADS-B") squitter. A squitter is an unsolicited transmission of information. ADS-B squitters are typically transmitted periodically via an omnidirectional antenna. ADS-B squitters are currently sent by many commercial aircraft. Lead ship track data is not limited to data received from ADS-B squitters, however, but may be received or obtained in any manner, including, without limitation, Traffic Information Services—Broadcast (TIS-B) and Automatic Dependent Surveillance—Relay (ADS-R).

Own ship track data 112 may comprise data that describes the track of own ship. Own ship track data may include the altitude, latitude, and longitude of own ship over a series of time periods. In this regard, any conventional locator may be used to obtain own ship track data, such as GPS. Other techniques for obtaining own ship track data may include a subsystem cooperative with GLONASS satellites, a subsystem cooperative with the well known LORAN system, an inertial navigation system, radio navigation, and/or radio navigation based on Very High Frequency Omni Range (VOR) radios and/or Distance Measuring Equipment (DME).

Merging and spacing constraints 113 may describe any desired distance or time spacing between own ship and a lead ship at certain locations within a flight plan. The merging and spacing constraints may be predetermined for a particular flight plan. In addition, the merging and spacing constraints may be updated during the flight based on information supplied by air traffic control.

Based on the speed target 105, lead ship track data 111, own ship track data 112, and merging and spacing constraints 113, the merging and spacing unit 110 may calculate a nominal speed target adjustment 115. By knowing own ship's track and the lead ship's track, merging and spacing unit 110 is able to compute if the merging and spacing constraints will be maintained given the speed target 105 produced by FMS 100. If continuing to fly at speed target 105 will cause the spacing distance or time between the lead ship and own ship to decrease, merging and spacing unit 110 may calculate a nominal downward adjustment in target speed to maintain the desired spacing. Likewise, if continuing to fly at speed target 105 will cause the spacing distance or time between the lead ship and own ship to increase, merging and spacing unit 110 may calculate a nominal upward adjustment in target speed to maintain the desired spacing.

Merging and spacing unit 110 may also utilize other data 114 in calculating a nominal speed target adjustment 115. Other data that may be taken into consideration may include the distance to destination or any other point in space, the estimated time to destination or any other point in space, the estimated time of arrival at destination or at any other point in space, the required time of arrival at destination or some other point in space, the altitude of the aircraft, and the current speed of the aircraft. For example, as the distance to destination gets smaller, a greater nominal change in speed target may be required to maintain the desired merging and spacing constraints because the distance or time available to get into proper spacing is more limited. In addition, a lower altitude may also indicate that less time and distance is available to correct an undesired spacing, so a higher nominal speed target adjustment 115 may be warranted.

The nominal speed target adjustment 115 may be further processed by limiter 120. FIG. 4 shows limiter 120 as a separate unit, but the functionality of limiter 120 may be included in the computer-executable code executed by merging and spacing unit 110. Limiter 120 may serve to limit the amount of the nominal speed target adjustment 115 and produce a speed target adjustment 125. For example, limiter 120 may be programmed to limit the total amount of speed target adjustment to some value below a predetermined threshold. In this way, very large adjustments of speed are avoided, as such large adjustments may be uncomfortable or disconcerting for passengers. In addition, limiter 120 may also limit nominal speed target adjustments below a certain predetermined threshold. That is, nominal speed target adjustments below a certain level (e.g., 5 knots) are not recommended to the pilot. This prevents frequent changes in aircraft speed, which again, may be uncomfortable or disconcerting for passengers. Another way in which limiter 120 may limit the frequency of speed target adjustments is by limiting the time between adjustments. For example, limiter 120 may be programmed such that a new speed target adjustment is not calculated for at least X number of seconds (or other time period) after a previous adjustment. Like merging and spacing unit 110, limiter 120 may also consider other data 121 (e.g., distance to destination, the altitude of the aircraft, and the current speed of the aircraft) to determine how much to limit the nominal speed target 115.

Speed target adjustment 125 may then be added to speed target 105 by adder 130 to form a merging and spacing speed target 135. The merging and spacing speed target 135 may then be communicated to the pilot in any manner. For example, the merging and spacing speed target may be communicated to the pilot audibly, visually (e.g., on the pilot's primary flight display or dedicated display), or a combination of both. The merging and spacing speed target 135 may be a groundspeed target, an indicated airspeed target, a mach target, or any other speed reference. In addition or alternatively, the merging and spacing speed target 135 may be sent directly to an automatic flight controller (e.g., an automatic pilot) that automatically changes the flight characteristics of the aircraft to achieve the merging and spacing speed target. Flight characteristics of the aircraft may include engine rpm, flap angle, flap deployment, etc.

Figure 5:
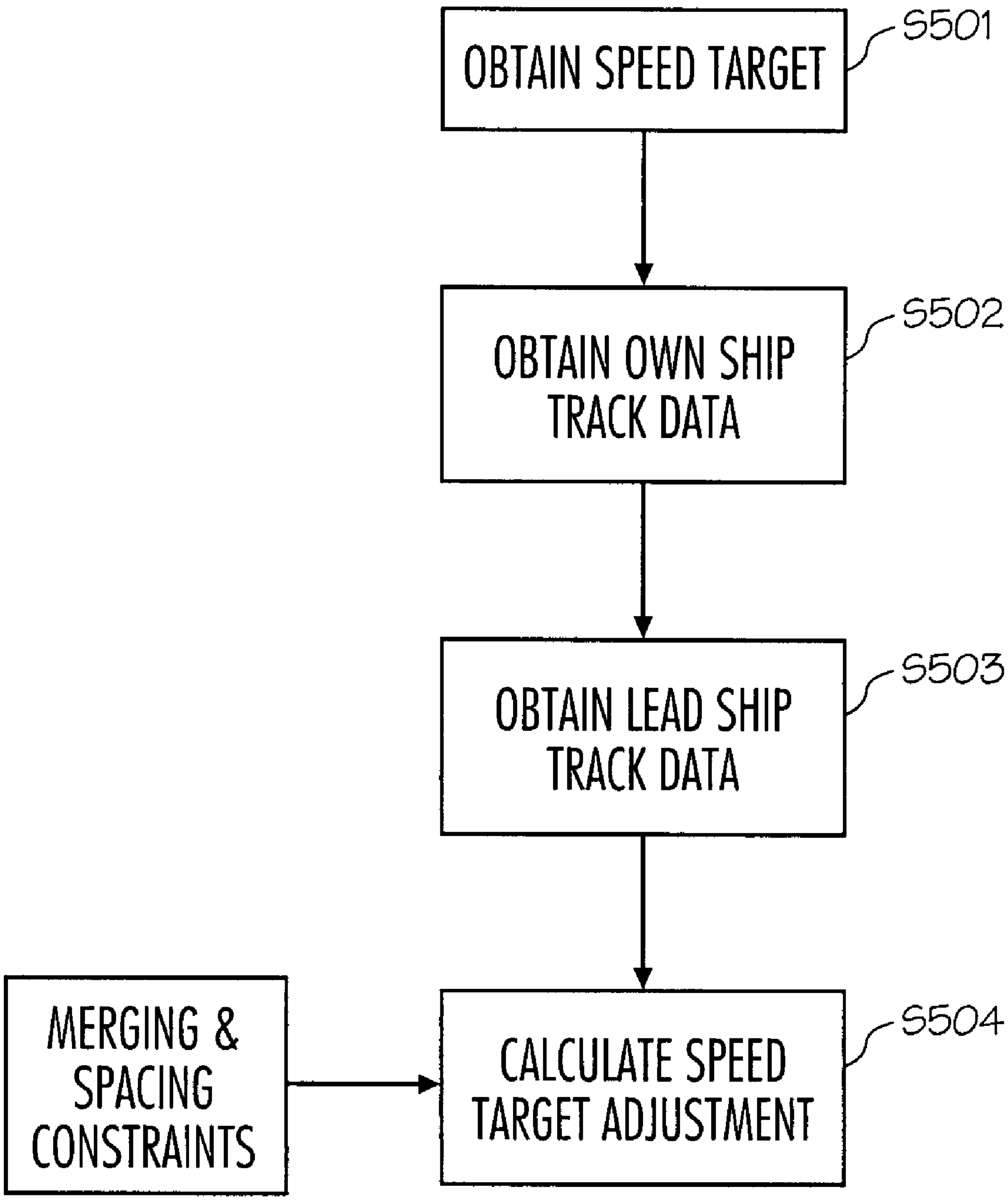
FIG. 5 is a flowchart of a method in accordance with an embodiment of the present invention.

FIG. 5 is a flowchart of a method of one embodiment of the present invention. Initially in step S501, a speed target is obtained. As described above, the speed target may be obtained from existing onboard equipment, such as an FMS or any other equipment onboard or external to the aircraft and may even be provided by a pilot. Next in step S502, own ship track data may be obtained. Then in step S503, lead ship track data may be obtained. Lead ship track data may be obtained directly from the lead ship in the form of ADS-B squitters or any desired broadcast or data transmission. In step S504, a speed target adjustment may be calculated based on the own ship track data, the lead ship track data, and merging and spacing constraints. This speed target adjustment may then be communicated to and carried out by the pilot or automatically carried out by an automatic flight controller.

As discussed above, the methods for adjusting the speed target of an aircraft may be implemented in circuitry, firmware, and/or software. For example, any conventional circuitry may be used (e.g., multiple redundant microprocessors, application specific integrated circuits). The circuitry may include conventional logic circuit(s), controller(s), microprocessor(s), and state machine(s) in any combination. In addition to hardwired circuitry and/or firmware, the methods may be implemented as a software program stored in memory 171 and executed by processor 170 or by any conventional method utilizing software.

Other embodiments of the invention will be apparent to those skilled in the art from consideration of the specification and embodiments disclosed herein. For example, merging and spacing could be employed as an air traffic procedure whereby multiple aircraft traveling from a variety of starting points are merged into a single file line with appropriate space between successive aircraft at any point in flight. Thus, the specification and examples are exemplary only, with the true scope and spirit of the invention set forth in the following claims and legal equivalents thereof.

What is claimed is:

1. A method for adjusting a speed target of an aircraft, the method comprising:
- obtaining a speed target;
- obtaining own ship track data for the aircraft;
- obtaining lead ship track data for a leading aircraft; and
- calculating a speed target adjustment based on the speed target, the own ship track data, the lead ship track data and merging and spacing constraints.

2. The method of claim 1 wherein the value of the speed target adjustment is limited based on at least one of the speed target, own ship distance to destination, own ship speed, own ship altitude, lead ship distance to destination, lead ship speed, and lead ship altitude.

3. The method of claim 1 further comprising adding the speed target adjustment to the speed target to form a merging and spacing speed target.

4. The method of claim 3 further comprising reporting the merging and spacing speed target to a pilot of the aircraft.

5. The method of claim 1 further comprising adding the speed target adjustment to the speed target to form a merging and spacing speed target if it is determined that the speed target adjustment is greater than a predetermined threshold.

6. The method of claim 1 further comprising adjusting the flight characteristics of the aircraft to achieve the speed target adjustment.

7. The method of claim 1 wherein the speed target is obtained from a flight management system resident on the aircraft.

8. The method of claim 1 wherein the lead ship track data is received from the leading aircraft via ADS-B squitters.

9. A computer-executable program stored on a computer-readable medium, the program for adjusting a speed target of an aircraft, the program comprising:
- code for obtaining a speed target;
- code for obtaining own ship track data for the aircraft;
- code for obtaining lead ship track data for a leading aircraft; and
- calculating code for calculating a speed target adjustment based on the speed target, the own ship track data, the lead ship track data, and merging and spacing constraints.

10. The program of claim 9 wherein the value of the speed target adjustment is limited based on at least one of the speed target, own ship distance to destination, own ship speed, own ship altitude, lead ship distance to destination, lead ship speed, and lead ship altitude.

11. The program of claim 9 further comprising code for adding the speed target adjustment to the speed target to form a merging and spacing speed target.

12. The program of claim 11 further comprising code for reporting the merging and spacing speed target to a pilot of the aircraft.

13. The program of claim 9 further comprising code for adding the speed target adjustment to the speed target to form a merging and spacing speed target if it is determined that the speed target adjustment is greater than a predetermined threshold.

14. The program of claim 9 further comprising code for adjusting the flight characteristics of the aircraft to achieve the speed target adjustment.

15. The program of claim 9 wherein the speed target is obtained from a flight management system resident on the aircraft.

16. The program of claim 9 wherein the lead ship track data is received from the leading aircraft via ADS-B squitters.

17. An apparatus for adjusting a speed target of an aircraft, the apparatus comprising:
- a microprocessor and computer-readable memory containing a computer program for:
  - obtaining a speed target;
  - obtaining own ship track data for the aircraft;
  - obtaining lead ship track data for a leading aircraft; and
  - calculating a speed target adjustment based on the speed target, the own ship track data, the lead ship track data, and merging and spacing constraints.

18. The apparatus of claim 17 wherein the value of the speed target adjustment is limited based on at least one of the speed target, own ship distance to destination, own ship speed, own ship altitude, lead ship distance to destination, lead ship speed, and lead ship altitude.

19. The apparatus of claim 17 wherein the computer program further performs adding the speed target adjustment to the speed target to form a merging and spacing speed target.

20. The apparatus of claim 19 wherein the computer program further performs reporting the merging and spacing speed target to a pilot of the aircraft.

21. The apparatus of claim 17 wherein the computer program further performs adding the speed target adjustment to the speed target to form a merging and spacing speed target if it is determined that the speed target adjustment is greater than a predetermined threshold.

22. The apparatus of claim 17 wherein the computer program further performs adjusting the flight characteristics of the aircraft to achieve the speed target adjustment.

23. The apparatus of claim 17 wherein the speed target is obtained from a flight management system resident on the aircraft.

24. The apparatus of claim 17 wherein the lead ship track data is received from the leading aircraft via ADS-B squitters.

* * * * *